No. 795,129. Patented July 18, 1905.

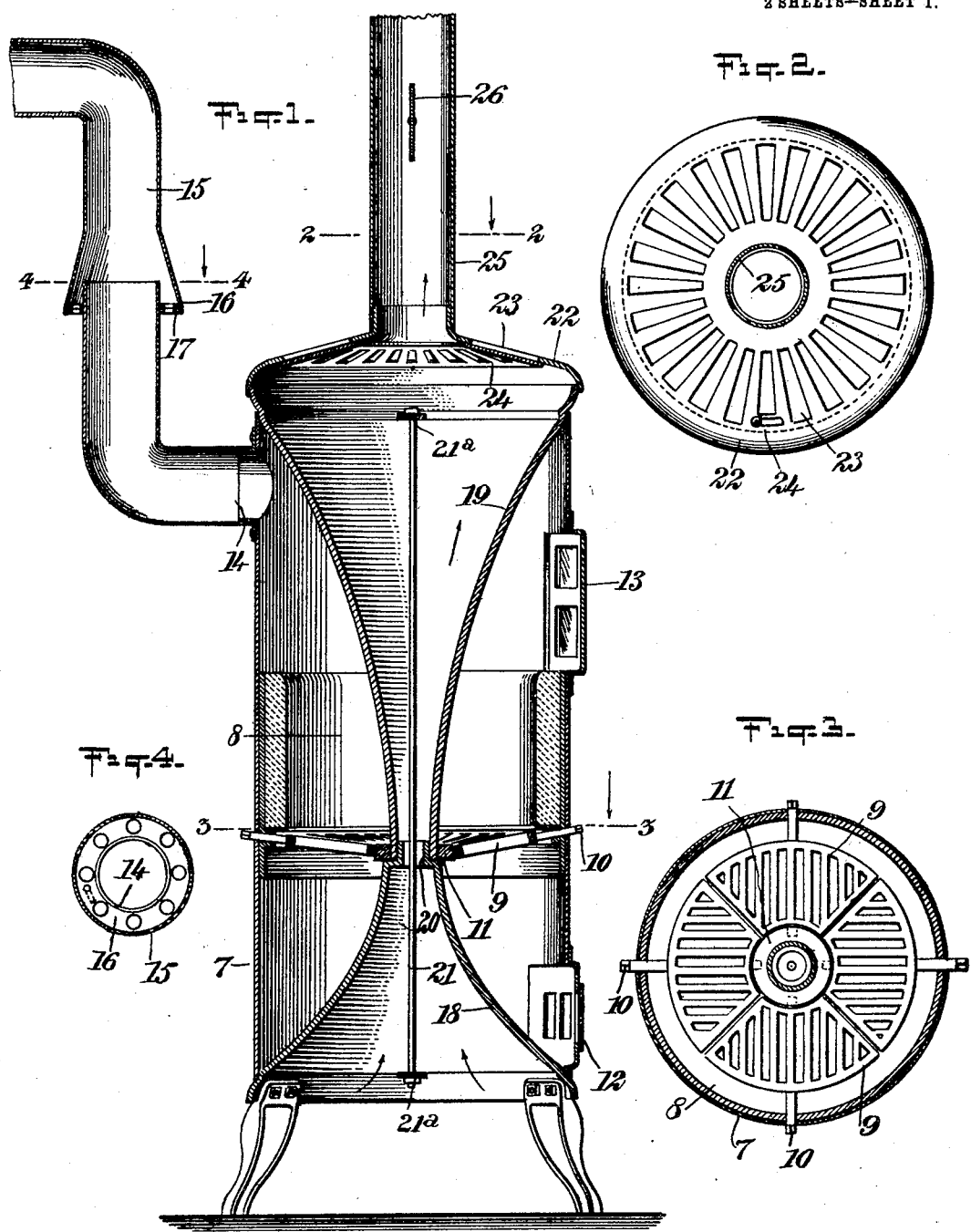

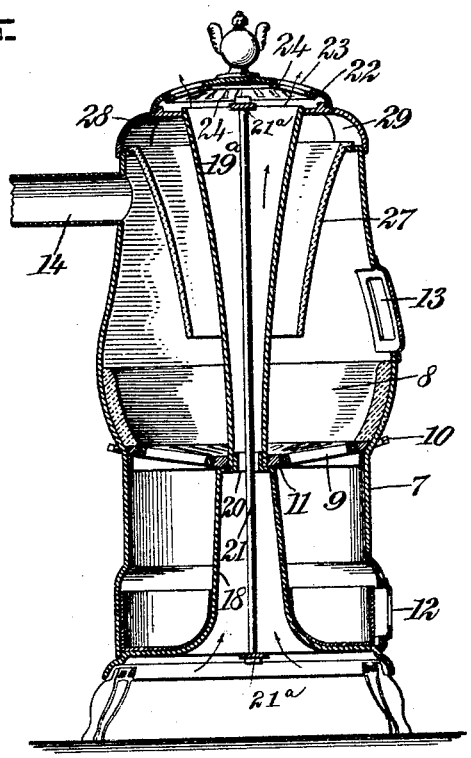
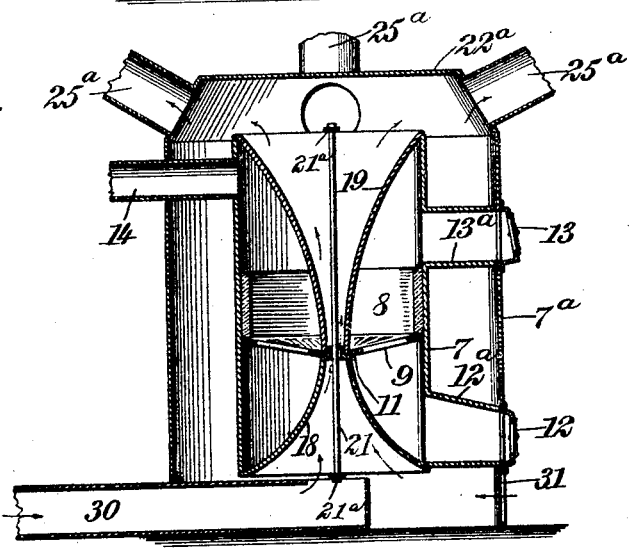

UNITED STATES PATENT OFFICE.

CARLISLE BABBITT HOLDING, OF TOLEDO, OHIO.

VENTILATING-HEATER.

SPECIFICATION forming part of Letters Patent No. 795,129, dated July 18, 1905.

Application filed March 17, 1904. Serial No. 198,572.

*To all whom it may concern:*

Be it known that I, CARLISLE BABBITT HOLDING, a citizen of the United States, and a resident of Toledo, in the county of Lucas and State of Ohio, have invented a new and Improved Ventilating-Heater, of which the following is a full, clear, and exact description.

My invention relates to a heating device which is arranged to act as a ventilator and which is provided with means for causing circulation of the heated air.

The objects of my invention are to provide for the functions mentioned above, and especially to obtain a stove or other heating device which will permit the passage of air directly through the fire, but out of contact with it, in order to quickly and efficiently heat it, and further objects, which will appear in the course of the subjoined description.

Reference is to be had to the accompanying drawings, forming a part of this specification, in which similar characters of reference indicate corresponding parts in all the figures.

Figure 1 is a diametrical sectional view of a preferred form of my invention. Fig. 2 is a sectional view on the line 2 2 of Fig. 1, showing the top in plan. Fig. 3 is a sectional view on the line 3 3 of Fig. 1. Fig 4 is a sectional view on the line 4 4 of Fig. 1. Fig. 5 is a diametrical sectional view of a modification especially adapted for burning hard coal, and Fig. 6 is a similar view of another modification.

In Figs. 1, 2, 3, and 4, 7 represents the casing of a stove provided with a fire-box 8 and grate 9. The grate is preferably formed in four parts, as shown, and operated from projections 10, extending through the casing; but any form of grate may be used without departing from the spirit of my invention. A collar 11 for supporting the inner portion of the grate is provided. The casing is also provided with an ash-door 12 and a coal-door 13 in the casing. In the construction shown a smoke-pipe 14 is provided with an extension 15, having a bell-shaped nozzle fitting down over the upper end of the pipe 14 and provided with a valve in a portion between the upper end of the pipe 14 and the bell end of the pipe 15, this valve consisting of parts 16 and 17, having perforations and adapted to be turned on each other in order to cause the perforations to register or not, as desired. The parts described constitute the device for burning the fuel. The air circulating and heating arrangement consists of the following parts: Two shells 18 and 19 are formed nearly in the shape of a bell, or, as I prefer to describe it, in the shape of a morning-glory, as shown. The shell 18 is placed with the flaring end downward and is provided with a shoulder 20, upon which rests the small end of the shell 19. A rod 21 is used for securing and holding the two shells in position by the aid of cross-bars $21^a$. A cap 22 is placed over the flaring end of the upper shell, and it is provided with a series of radial or other holes 23, which are adapted to be closed when desired by means of a plate 24, similarly perforated. A pipe 25 may be attached to the top of the cap and is designed for conducting the heat to any desired point. A valve 26 may be arranged within the pipe 25 at any desired point. It will be seen that when a fire is built on the grate in the fire-box the air within the shell 19 will be rapidly heated, which will cause it to ascend through the pipe 25 or the openings 23, or both, according to the arrangement of the valves 24 and 26. The air at the smallest part of the shell 19 will be exceedingly hot and on account of its quickly rising will cause a free admission of air through the open end of the shell 18 below. The cold air of the room, which is naturally at the lower part, will thus be drawn through the hottest part of the fire and without contamination by the gases produced by the fuel will be forced out at the top. At the same time radiation from the outside of the stove will not be checked and this source of heat will be as effective as with the use of the present forms of stoves. The stovepipe-ventilator shown at 17 acts as a check-valve. The flaring shape of the pipe 15 permits air to pass around the pipe 14 and go off with the products of combustion. The draft created by the products of combustion passing up through the pipes 14 and 15 will when desired cause the hot air from the room to be carried up with them in case this ventilator is placed at the top of the room and opened. A check is secured by this construction, which may be used to prevent too rapid combustion of fuel. It will be seen that by the use of this construction the room in which the stove is placed may be heated by radiation in the ordinary way, while the cold air is drawn from it and passed through the stove, thereby being heated, and may be passed into another room without abstracting any heat whatever from the room in which the stove is placed. This permits a low and slow fire to be used, which gives a great increase in heat and economy of fuel and when another room is to be heated furnishes that heat without robbing the room in which the stove is placed. It will be seen also that the use of the shell 19 having the lower end closed and without conjunction with the upper end of the shell 18 would increase the heating capacity by the increased radiation of the interior surface of the shell 19 and without increase of fuel, and it will be seen that in that case the interior surface of the shell 19 would be nearest the fire and above it, and hence the hottest part of the stove, giving off more heat in proportion to the surface area than any other part of the stove.

In Fig. 5, which shows a construction especially adapted for burning hard coal, the parts 7, 8, 9, 10, 11, 12, 13, 14, 18, 20, 21, 22, 23, and 24 are the same as the parts having the same numbers in the other figures. In place, however, of the shell 19 a shell 19$^a$ of similar construction, but not extending to the outer surface of the casing, is employed. 27 is a feeding device for the coal, which device may be of any ordinary construction used in stoves of this character. The top of the casing 7 is also provided with an additional cap 28, which supports the cap 22 and is provided with an opening 29 for the introduction of coal.

Fig. 6 shows another modification, preferably used for heating several rooms, in which the parts 7, 8, 9, 11, 12, 13, 14, 18, 19, and 21 are substantially the same as the parts having the same numerals in Fig. 1. An additional casing 7$^a$, however, is provided, and the doors 12 and 13 are provided in this casing, thus necessitating elongated passages 12$^a$ and 13$^a$. The heated air preferably passes out through a dome 22$^a$, provided with a plurality of passages 25$^a$, which may lead to any number of points. Cold air comes in at the bottom through the passage 30, leading into the casing 7$^a$ from any outside point, or through an opening 31, as shown. In this form the casing 7$^a$ is provided for the purpose of permitting the main part of the radiation from the casing 7 to be used for heating air that can be conducted away to other rooms, thus permitting the use of the device in a room which is not intended to be heated as hot as the other rooms connected with it. The passage 30 may be connected with any point outside of the room—as, for instance, with the outside air—in which case this cold air will be passed immediately through the interior of the heater, while the warmer air will be admitted through the opening 31 to the passage formed between the casings 7 and 7$^a$. Thus the coldest air will be subjected to the greatest heat.

In all the forms shown my invention provides for an effective ventilation of the room heated, as well as a complete circulation of the air through the room in which the heater is contained, and also provides for the introduction of comparatively pure air into the other rooms to be heated. If desired, the room in which the heater is contained may be ventilated by opening windows in a room communicating therewith through the pipe shown, which will permit the passage of the contaminated air from the first-named room without the possibility of introducing direct drafts into the room.

It will be obvious that all the forms shown except Fig. 5 may be used with any kind of fuel, and although I have shown a grate in each case I do not wish to be limited to a heating device having a grate. Heating devices using liquid or gaseous fuel would come within the scope of my invention.

I do not wish to be limited to the exact construction shown, as it will be obvious from the three modifications illustrated that many changes may be made without departing from the spirit of my invention as set forth in the claims.

Having thus described my invention, I claim as new and desire to secure by Letters Patent—

1. A heating device comprising a casing, a fire-box therein, a central air-passage through said casing and fire-box, comprising two flaring shells, and a shoulder on one of said shells constituting a support for the other shell and for a grate.

2. A heating device comprising a casing, a central air-conducting passage through said casing, comprising two flaring shells, one of said shells being provided with a shoulder constituting a support for the other shell, the small ends of the shells being placed together, and a heating means within said casing supported by said shoulder and surrounding said shells.

In testimony whereof I have signed my name to this specification in the presence of two subscribing witnesses.

CARLISLE BABBITT HOLDING.

Witnesses:
ELLA M. NEVILLE,
A. M. VANDERSALL.